INVENTORS.
CONRAD R. HILPERT.
RAYMOND C. SCHNEIDER.

BY
johnW Darley
ATTORNEY.

United States Patent Office 3,324,979
Patented June 13, 1967

3,324,979
POWER TRANSMISSION
Conrad R. Hilpert, Winnebago, and Raymond C. Schneider, Rockford, Ill., assignors to Twin Disc Clutch Company, Racine, Wis., a corporation of Wisconsin
Filed Aug. 30, 1965, Ser. No. 483,714
18 Claims. (Cl. 192—3.5)

Our invention relates to power transmissions and more particularly to a type that is specially arranged for hoists, cranes and shovels in that provision is made for application of power to the hoisting or digging implements of the associated apparatus during raising and lowering.

For convenience in describing the invention, raising and lowering of the load will be referred to as "power up" and "power down" applications, respectively.

One object of the invention is to provide a transmission of the character indicated in which power up and power down applications are at all times under infinitely smooth, positive control and including a like control during transition from up to down and vice versa.

A further object is the provision of such a transmission in which control is exercised by a single control member and which is further characterized by a fail safe construction that, in the event of failure of the hydraulic control circuitry, will enable a brake to prevent free dropping of the load.

A further object is to provide a transmission as set forth in which the infinitely smooth power up and power down controls of the load are independent of engine speed.

A further object is to provide such a transmission in which the single control member enables the power input and a brake connected to the transmission output to be so relatively controlled as to accurately position a heavy load at the end of either an up or a down movement.

A further object is the provision of a power transmission including an input controlled slip, power clutch and a single stage, stationary housing, hydraulic torque converter in conjunction with an arrangement to provide reverse driving of the converter to enable a connected hoist drum to be driven backward, or downward with respect to the load, at a speed nearly as high as that when power flow through the converter to the hoist is in an up direction with respect to the load.

A further object is to provide a transmission as indicated wherein the converter is coupled to a heat exchanger to secure by auto-circulation therebetween a dissipation of the heat load generated during a fast lowering of heavy loads.

In each of the transmissions described herein, it will be understood that the output shaft would be connected, for example, to the input of a drum or an equivalent unit in a hoisting and lowering apparatus.

Figure 1:
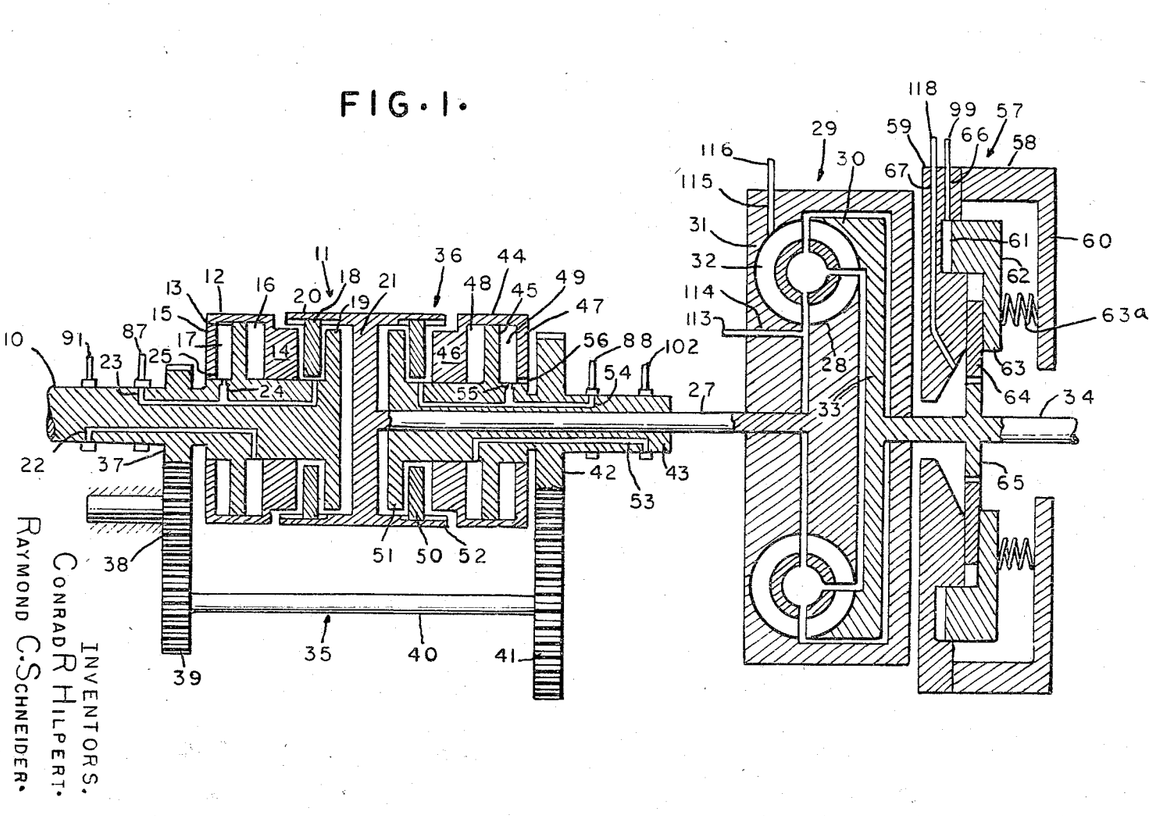
FIG. 1 is a sectional and schematic elevation of one form of the improved transmission including controlled slip, hydraulically actuated, friction clutches which determine through a hydraulic torque converter up and down movements of the load, respectively, and a controlled slip, friction brake which is engageable to hold the transmission output shaft stationary, the clutches being shown released and the brake fully engaged.

Referring to FIG. 1 of the drawings, the numeral 10 designates an input shaft which is respectively connected to a power source (not shown), such as an engine or a turbine, and to an up clutch 11 shown in release position and which includes an annular casing 12 that surrounds the shaft 10 and an annular reaction member 13 extending laterally from and rotating with the shaft 10. The casing 12 is shiftable axially relative to the shaft 10 and reaction member 13 and is provided with annular end walls 14 and 15 which respectively define with the shaft 10 and reaction member 13 annular apply and balance chambers 16 and 17.

When the circulating medium for the transmission, usually a suitable oil, is supplied under pressure to the apply chamber 16, the casing 12 is shifted to the right to frictionally engage the end wall 14 with a driven clutch plate 18 against an abutment ring 19 fast to the shaft 10. The outer periphery of the clutch plate 18 is splined to the counterbored portion 20 of a rotary member 21 which is coaxial with the shaft 10.

Engaging pressure oil is supplied to the apply chamber 16 under selected and controlled conditions through a passage 22 in the shaft 10 and cooling oil is supplied to the friction surfaces of the up clutch 11 through a passage 23 also in the shaft 10 and the passages 22 and 23 are tied in with an oil circuit presently described. While the cooling oil supply to the up clutch 11 is constant, it varies in amount depending upon whether this clutch is released or fully or partly engaged, being less in release than in either of the other conditions as will be described in connection with FIG. 2. To conventionally balance the centrifugal head developed in the apply chamber 16, oil is supplied to the balance chamber 17 by tapping the cooling oil passage 23 through an orifice 24 and the balance chamber 17 is vented by a conventional relief 25.

When engaged to any extent, the up clutch 11 transmits power through the rotary member 21 to a connected intermediate shaft 27 and thence to an impeller 28 forming part of a single stage, stationary housing, hydraulic torque converter 29 which otherwise includes a turbine 30 and a stator 31, the impeller 28, turbine 30 and stator 31 being conventionally related in a toroidal circuit 32. The turbine 30 connects through a disk 33 with an output shaft 34 attached to the load.

Power down movements of the load are determined by a sequentially related reverse gear train 35 and a down clutch 36. Specifically, the gear train 35 includes a gear 37 rotating with the input shaft 10 and which through an idler gear 38 drives a gear 39 mounted on a countershaft 40 which also carries a gear 41 that meshes with a gear 42. The latter gear is fast on a sleeve shaft 43 through which the intermediate shaft 27 extends in coaxial relation.

The down clutch 36 is coaxial with the sleeve shaft 43 and includes an annular casing 44 that surrounds the shaft 43 and an annular reaction member 45 extending laterally from and rotating with the sleeve shaft 43. The casing 44 is shiftable axially relative to the sleeve shaft 43 and reaction member 45 and is provided with annular end walls 46 and 47 which respectively define with the sleeve shaft 43 and reaction member 45 annular apply and balance chambers 48 and 49.

When pressure oil is supplied to the apply chamber 48, the casing 44 shifts to the left to frictionally engage the end wall 46 with a driven clutch plate 50 against an abutment ring 51 fixed to the sleeve shaft 43. The outer periphery of the clutch plate 50 is splined to a counterbored portion 52 of the rotary member 21.

Engaging pressure oil is supplied to the apply chamber 48 through a passage 53 in the sleeve shaft 43 and cooling oil is supplied to the friction elements of the down clutch 36 through a passage 54 also in the sleeve shaft 43 and the passages 53 and 54 are tied in with an oil circuit presently described. The cooling oil supply to the down clutch 36 has the same characteristics as the same supply for the up clutch 11 as described above. Oil is supplied to the balance chamber 49 by tapping the cooling oil passage 54 through an orifice 55 and the balance chamber 49 is vented by a conventional relief 56.

When engaged to any extent, the down clutch 36 transits power through the rotary member 21 to the intermediate shaft 27 and hence to the impeller 28. However, this rotation, by virtue of the reverse gear train 35, is in the opposite direction to that provided by the up clutch 11, including reverse rotation of the impeller 28 and turbine 30.

Still referring to FIG. 1, there is associated with the output shaft 34 a spring biased brake 57 which when fully engaged will hold the load in any position and which may be modulatingly released to provide any desired degree of braking restraint. Further, if released at a time when power fails, the brake 57 will automatically engage to hold the load stationary.

The brake 57 includes an annular housing 58 which is coaxial with the output shaft 34 and carries annular end walls 59 and 60. Recessed in the end wall 59 is an annular release chamber 61 in which is reciprocable an annular piston 62 carrying an inwardly extending, annular plate 63. A plurality of springs 63a suitably spaced around the housing 58 between the wall 60 and plate 63 bias the plate 63 to the fully engaged position shown in which the plate 63 frictionally engages a brake ring 64 against the wall 59. The brake ring 64 has toothed engagement with an annular hub 65 fixed to the output shaft 34. The brake 57 may be controlled and modulatingly released by pressure oil supplied to the release chamber 61 through a passage 66 and cooling oil is supplied through a passage 67 to the friction surfaces of the brake 57, the passages 66 and 67 being included in the wall 59 and tied in with an oil circuit presently described.

Figure 2:
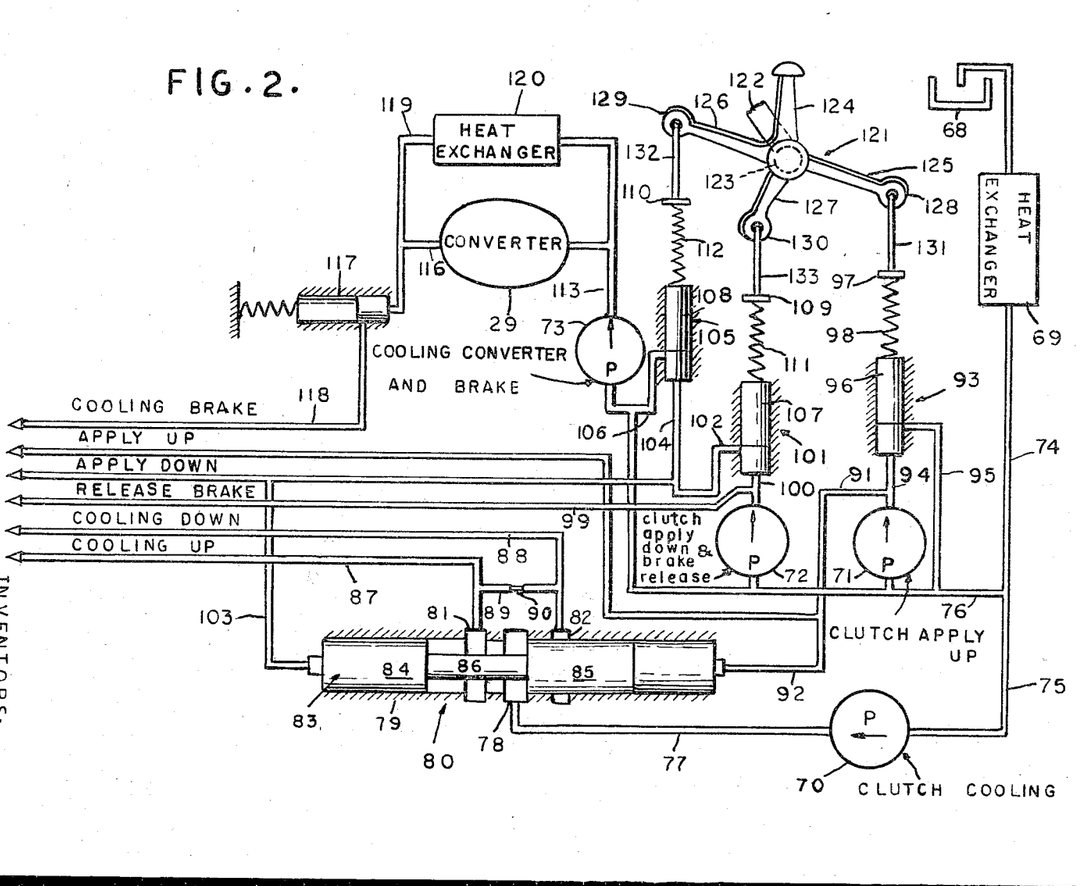
FIG. 2 is a schematic of the oil circuitry for the FIG. 1 transmission with the several parts related to determine the transmission conditioning shown in FIG. 1.

The oil circuit for the FIG. 1 transmission is shown in FIG. 2 to which reference will now be made. The oil is withdrawn from a convenient sump 68 through a heat exchanger 69 by means of positive displacement pumps 70, 71, 72 and 73. The heat exchanger outlet pipe 74 connects with an inlet pipe 75 for the pump 70 and also with an inlet pipe 76 for the pumps 71, 72 and 73. The pumps 71, 72 and 73 are in parallel flow relation as a group and in like relation to the pump 70.

The pump 70 provides cooling oil flow for the friction elements of the up and down clutches 11 and 36, respectively, by an arrangement which, under operating conditions, enables more flow to that cltuch which is transmitting torque than to the released clutch. For this purpose, the outlet pipe 77 from the pump 70 connects with an inlet port 78 provided in the casing 79 of a position valve 80 and the casing 79 also includes outlet ports 81 and 82 which are on opposite sides, respectively, of the inlet port 78. Slidable in the casing 79 is a conventional spool member 83 having end lands 84 and 85 which are connected by a reduced neck 86.

The position valve 80 always occupies one of two positions, viz., either that shown or one in which the spool member 83 is displaced to the extreme right of that shown. The means for effecting shifts of the position valve 80 will be presently described. For convenience, it will be assumed that the position valve 80 is located as shown, such as could occur at the end of a previous operation with both clutches released and the brake engaged. In the shown position of the spool member 83, the inlet and outlet ports 78 and 81, respectively, are in communication to provide oil flow through a pipe 87 which connects with the passage 23 (see FIG. 1) leading to the friction elements of the up clutch 11. At this time, while the outlet port 82 is masked by the land 85, provision is made for a limited oil flow from the pipe 87 to a pipe 88, one end of which connects with the outlet port 82 and the opposite end with the passage 54 (see FIG. 1) leading to the friction elements of the down clutch 36. The limited oil flow is effected by a pipe 89 bridged between the pipes 87 and 88 and including an orifice 90. From the foregoing, it will be apparent that with the up clutch 11 engaged, the major cooling oil supply will be delivered thereto and a substantially less quantity to the down clutch 36.

The inlet of the pump 71 connects with the pipe 76 and its outlet connects through a pipe 91 with the passage 22 (see FIG. 1) for supplying pressure oil to the apply chamber 16 of the up clutch 11. A pipe 92 connects the pipe 91 with the right end of the position valve casing 79 and the pressure thus supplied holds the spool member 82 in the left position shown in FIG. 2 during clutch up operation.

The pressure in the apply chamber 16 may be varied as desired to provide any torque transmitting condition of the up clutch 11 by means of a controlled pressure regulating valve 93 whose inlet connects by a pipe 94 with the pipe 91 and hence with the outlet of the pump 71. The outlet of the valve 93 connects by a pipe 95 with the pipe 76. The valve 93 includes a conventional piston 96 and interposed between the piston 96 and a push plate 97 is a spring 98. Movement of the push plate 97 towards the piston 96, determined as presently described, provides a means for controllably varying the pressure in the pipe 91 and hence that in the apply chamber 16 of the up clutch 11.

The inlet of the pump 72 connects with the pipe 76 and its outlet connects through a pipe 99 with the passage 66 (see FIG. 1) leading to the release chamber 61 of the brake 57. A pipe 100 connects with the pipe 99 and hence with the outlet of the pump 72 and also with the inlet of a controlled pressure regulating valve 101 whose outlet connects through a pipe 102 with the passage 53 (see FIG. 1) leading to the apply chamber 48 of the down clutch 36. The pipe 102 also connects through a pipe 103 with the left end of the position valve casing 79 to shift the spool member 83 to the extreme right when pressure is established, as presently described, in the apply chamber 48 of the down clutch 36. The major portion of the cooling oil supply is then diverted to the friction elements of the down clutch 36 through the pipe 88.

A pipe 104 connects the pipe 102 with the inlet of a controlled pressure regulating valve 105 whose outlet connects by a pipe 106 with the pipe 76. The valves 101 and 105 include conventional pistons 107 and 108 and interposed between these pistons and push plates 109 and 110 are springs 111 and 112, all respectively. Movements of the push plates 109 and 110, selectively determined and controlled as presently described, provides means for selectively and controllably varying the pressures in the release chamber 61 of the brake 57 and in the apply chamber 48 of the down clutch 36.

From the above, it will be apparent that, under certain conditions, the regulating valve 105 is in back pressure relation to the regulating valve 101 in the sense that when full pressure is present in the down clutch apply pipe 102, it is also present in the brake release pipe 99. This arrangement positively insures release of the brake 57 when the down clutch 36 is fully engaged.

The inlet of the pump 73 connects with the pipe 76 and its outlet connects through a pipe 113 with a passage 114 (see FIG. 1) leading to the toroidal circuit 32 of the converter 29. Oil discharged from the converter flows successively through a passage 115 in the converter 29 and a pipe 116 to the inlet of a conventional pressure regulating valve 117 whose outlet connects through a pipe 118 with the passage 67 (see FIG. 1) to supply cooling oil to the brake 57, the regulating valve 117 maintaining a basic pressure in the converter 29. Bridged around the converter 29 and connecting with the pipes 113 and 116 is a pipe 119 which includes a heat exchanger 120. The latter cools the converter 29 by auto-circulation and dissipation of the energy arising from the control of a falling load is limited only by the capacity of the heat exchanger 120.

A feature of the invention is the employment of a single control member for infinitely controlling the pressure regulating valves 93, 101 and 105 to determine any desired torque transmitting condition of the up and down clutches 11 and 36, respectively, and any desired retarding restraint of the brake 57.

The control member 121 is for convenience shown in isometric view and is mounted on a support 122 for universal movement as schematically indicated by the ball 123. The member 121 includes a handgrip 124, arms 125 and 126 extending oppositely from the grip 124 and generally normal thereto, and a third arm 127 lying generally in the same plane as the arms 125 and 126 and generally normal thereto. The outer ends of the arms 125, 126 and 127 may be enlarged to provide platforms 128, 129 and 130 against which constantly bear the enlarged ends of pushrods 131, 132 and 133 whose opposite ends carry the push plates 97, 110 and 109, all respectively.

Considering the operation of the transmission, it is conveneint to begin with the conditioning thereof as shown in FIGS. 1 and 2, the up and down clutches 11 and 36, respectively, being released and the brake 57 engaged. This initial position may occur with the load in its lowermost position or at some higher elevation; in the latter case, the brake 57 holds the load stationary.

To initiate an up movement of the load, for example, the hand grip 124 is moved to cause a downward movement of the arm 127 to therefore begin loading the spring 111 to increase pressure in the release chamber 61 of the brake 57. If the load is in its lowest position, the brake release pressure can be quickly raised to its maximum value before clockwise rocking of the grip 124 to begin loading the spring 98 while maintaining the release loading on the spring 111. Loading of the spring 98 provides for pressure rise in the apply chamber 16 of the up clutch 11 and the load can be picked up smoothly by suitably controlling this pressure.

If the load is in an elevated position when further up movement is desired, smooth pickup of the load can be obtained while guarding against any dropping of the load by properly relating the modulating release of the brake 57 and the modulating engagement of the up clutch 11. As the load approaches the terminal up position, it may be inched to its proper location by the infinite control possible for the up clutch 11.

For down movements of the load from an elevated position, the brake is released as described above and the grip 124 is counterclockwise rocked to begin loading the spring 112 while maintaining release of the brake 57. During power down movements, the impeller 28 and turbine 30 rotate reversely and the hoist drum (not shown) can be rotated backward at nearly as high a speed as when rotating in the opposite direction. Hence, during lowering of the load, it is possible to utilize the normal characteristics of the converter 29. Complete control is available from full power up to full power down and the transition from full power down through a stop of any load to full power up may be accomplished smoothly.

Figure 3:
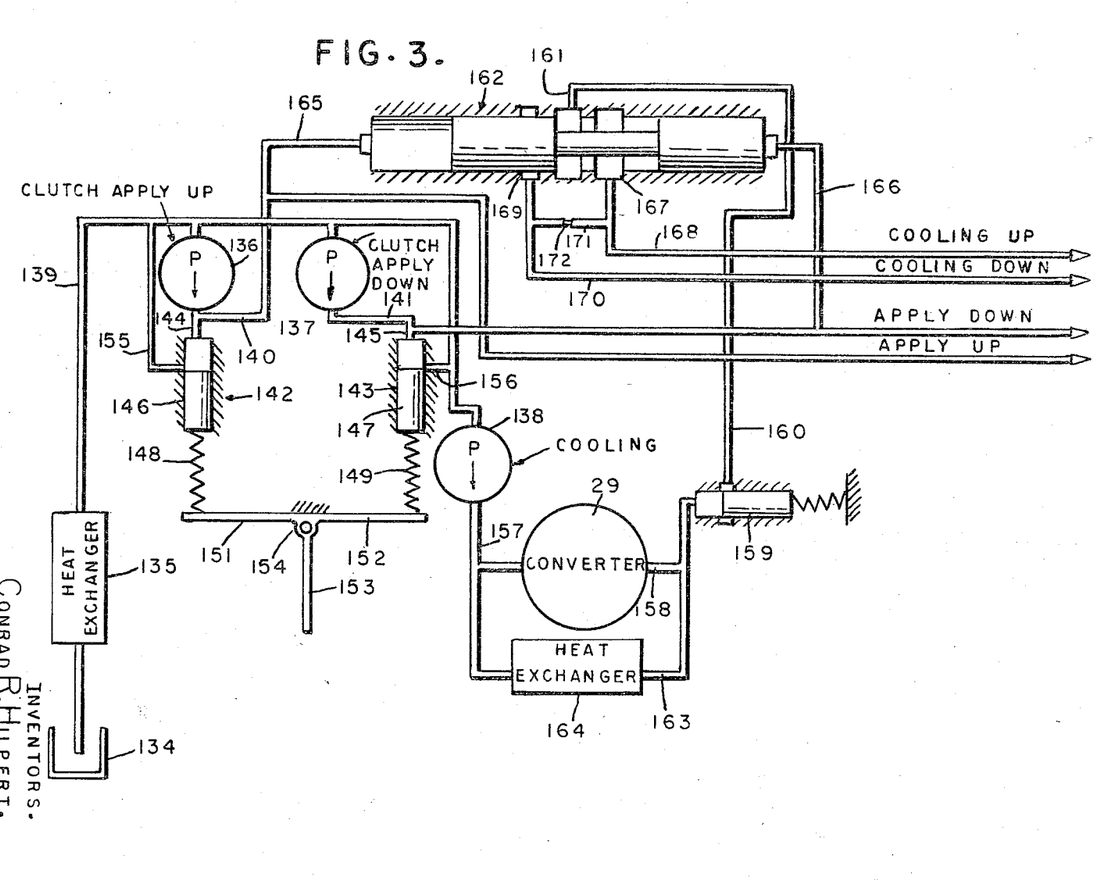
FIG. 3 is a schematic modification of the FIG. 2 oil circuitry in which the brake is eliminated.

In FIG. 3, there is illustrated oil circuitry for a modification of the FIG. 1 transmission in which the change consists in an elimination of the brake 57. With this arrangement, it is possible to use a single pump for cooling the converter and clutches in contrast to the two pumps 70 and 73 in FIG. 2. Since the FIG. 3 circuit is employed in connection with the up and down clutches 11 and 36, respectively, and the converter 29, the circuit will be related to certain parts having the FIG. 1 numerals.

Referring to FIG. 3, the oil is withdrawn from a sump 134 through a heat exchanger 135 by means of positive displacement pumps 136, 137 and 138 whose inlets connect with the heat exchanger outlet pipe 139, the pumps being in parallel flow relation. The outlet of the pump 136 connects through a pipe 140 with the passage 22 (see FIG. 1) for supplying pressure oil to the apply chamber 16 of the up clutch 11. The outlet of the pump 137 connects through a pipe 141 with the passage 53 (see FIG. 1) for supplying pressure oil to the apply chamber 48 of the down clutch 36.

As in FIG. 1, pressures in the apply chambers 16 and 48 may be varied to provide any torque transmitting condition of the up and down clutches 11 and 36, respectively, by means of controlled pressure regulating valves 142 and 143 whose inlets connect by pipes 144 and 145 with the pipes 140 and 141 and hence with the outlets of the pumps 136 and 137, all respectively. The valves 142 and 143 include pistons 146 and 147 whose positions may be varied by springs 148 and 149 controllably and selectively loaded by oppositely extending arms 151 and 152, all respectively. The arms 151 and 152 form part of a control lever 153 which is rockable on the pivot 154. The outlets of the valves 142 and 143 connect by pipes 155 and 156, respectively, with the pipe 139.

The outlet of the pump 138 connects through a pipe 157 with the passage 114 (see FIG. 1) leading to the toroidal circuit 32 of the converter 29. Oil discharged from the converter 29 flows successively through the passage 115 in the converter 29 and a pipe 158 to the inlet of a conventional pressure regulating valve 159 which maintains a basic pressure in the converter 29 and the outlet of the valve 159 connects through a pipe 160 with an inlet port 161 forming a part of a position valve 162. Bridged around the converter 29 is a pipe 163 including a heat exchanger 164 for the same purpose as in FIG. 1.

The position valve 162 is identical with the position valve 80 in FIG. 2 in the sense that it either occupies the location shown in FIG. 3 during up movements of the load and in which location it is held by pressure acting through the pipe 165 which connects with the pipe 140. During down movements of the load, the valve 162 shifts to the extreme left position due to pressure from the down pump 137 through a pipe 166 which connects with the pipe 141.

Cooling oil for the up and down clutches 11 and 36, respectively, is supplied by oil relieved from the converter 29 through the pipe 160 and, in the specific situation shown, this oil flows from the inlet port 161 to an outlet port 167 and thence through a pipe 168 to the passage 23 (see FIG. 1) leading to the friction elements of the up clutch 11. With the position valve 162 in the left position, the cooling oil flow is from the inlet port 161 to an outlet port 169 and thence through a pipe 170 to the passage 54 (see FIG. 1) leading to the friction elements of the down clutch 36. As with the position valve 80 and for the same purpose, there is associated with the position valve 162 a pipe 171 including an orifice 172 which is bridged between the pipes 168 and 170.

The FIG. 3 circuit also provides for smooth, infinitely controllable operation of the up and down clutch 11 and 36, respectively, by suitable operation of the control lever 153.

Figure 4:
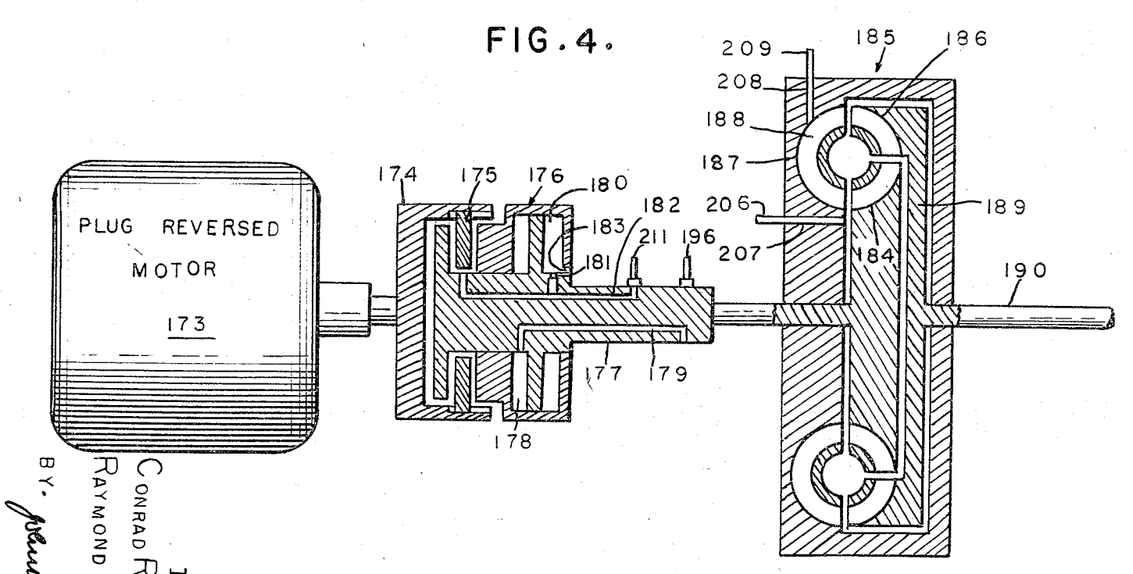
FIG. 4 is a schematic, sectional elevation of a further modification in which only one clutch is employed and up and down movements of the load are secured by means of a reversible motor, the clutch being shown released.
Figure 5:
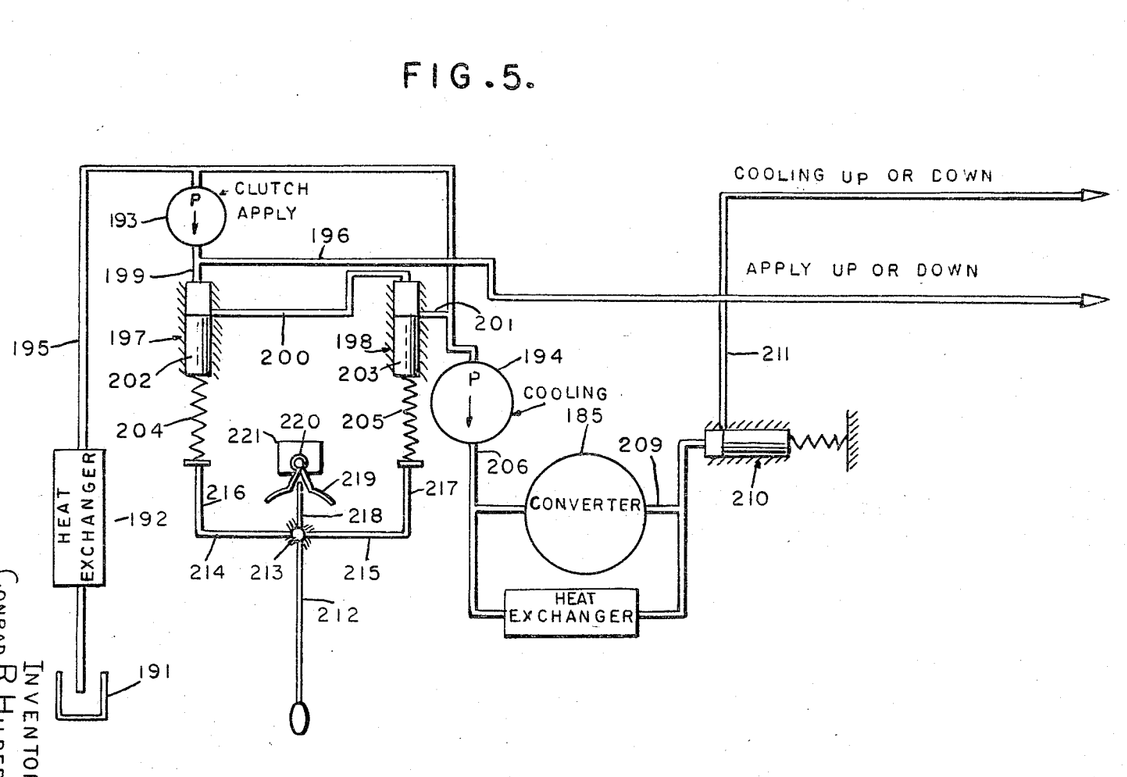
FIG. 5 is a schematic of the oil circuitry for the FIG. 4 transmission.

In FIGS. 4 and 5 is shown a further modification in which the brake and reverse gear train are eliminated and up and down movements are obtained by the use of an electric motor which is reversible in conjunction with a single clutch.

Referring to FIG. 4, the numeral 173 designates a reversible motor which drives a spider 174 that is internally splined for engaged with a driving plate 175 forming part of an hydraulically actuated, friction plate clutch 176 that is carried by and encircles an intermediate shaft 177. Since the clutch 176 is essentially similar to those described above, it will be sufficient to identify the principal elements necessary to tie into the oil circuit shown in FIG. 5.

Accordingly, the clutch 176 includes an apply chamber 178 to which pressure oil is supplied under controlled conditions through a passage 179 in the shaft 177 and a balance chamber 180 to which oil is supplied through an orifice 181 from a passage 182 also in the shaft 177, the passage 182 additionally providing cooling oil for the friction elements of the clutch 176, venting of the balance chamber 180 is provided by a conventional relief 183.

The shaft 177 connects with an impeller 184 forming part of a stationary housing, hydraulic torque converter 185 which otherwise includes a turbine 186 and a stator 187, the impeller 184, turbine 186 and stator 187 being conventionally related in a toroidal circuit 188. The turbine 186 connects through a disk 189 with an output shaft 190.

The oil circuit for the FIG. 4 transmission is shown in FIG. 5 to which reference will now be made. Oil is withdrawn from a sump 191 through a heat exchanger 192 by pumps 193 and 194 arranged in parallel flow relation and having their inlets connected to the heat exchanger outlet pipe 195. The outlet of the pump 193 connects through a pipe 196 with the passage 179 (see FIG. 4) for supplying pressure oil to the apply chamber 178 of the clutch 176. Considering the reversible motor 173, this pressure supply will cause up or down movements of the load depending upon the rotation direction of the motor 173.

As with the other clutches, the clutch 176 may be modulated to provide any torque transmitting condition thereof by means of controlled pressure regulating valves 197 and 198. The inlet of the valve 197 connects by a pipe 199 with the with the pipe 196 and hence with the outlet of the pump 193 and the outlet of the valve 197 connects by a pipe 200 with the inlet of the valve 198 whose outlet connects by a pipe 201 with the pipe 195. The valves 197 and 198 include conventional pistons 202 and 203 whose positions may be varied by springs 204 and 205 controlled and selectively loaded by mechanism presently described. Pressure in the pipe 196 for up clutch movements is determined directly by the valve 197 and for down clutch movements by the valve 198 through the valve 197.

The outlet of the pump 194 connects through a pipe 206 with a passage 207 in the converter 185 (see FIG. 4) for supplying oil to the toroidal circuit 188 and oil is discharged from this circuit through a passage 208 also in the converter 185 to a pipe 209 connected with the inlet of a conventional pressure regulating valve 210 which maintains a basic pressure in the toroidal circuit 188. The outlet of the valve 210 connects by a pipe 211 with the passage 182 (see FIG. 4) for supplying oil to the balance chamber 180 and the friction elements of the clutch 176.

Modulating control of the clutch 176 to provide up and down movements and control on the direction rotation of the motor 173 are provided by the following instrumentalities. A lever 212 pivoted at 213 includes oppositely extending arms 214 and 215 which respectively carry pushrods 216 and 217. The pushrods 216 and 217 bear against the adjacent ends of the springs 204 and 205 so that clockwise or counterclockwise rotation of the lever 212 will effect modulating control of the clutch 176 for up or down movements, all respectively, of the load.

Simultaneous control on the motor 173 to determine such movements is porvided by an arm 218 carried by the lever 212 and a generally cup-shaped member 219 which is fast to a rockable shaft 220 forming part of a conventional reversing switch 221. The relation between the arm 218 and member 219 is such that a clockwise movement of the lever 212 to load the spring 204 for an up movement, for example, counterclockwise rocks the member 219 and the shaft 220 to start the motor 173 in one direction, while still permitting additional rock of the member 212 in the indicated direction to further load the spring 204. The converse is true for a counterclockwise rotation of the lever 212.

Figure 6:
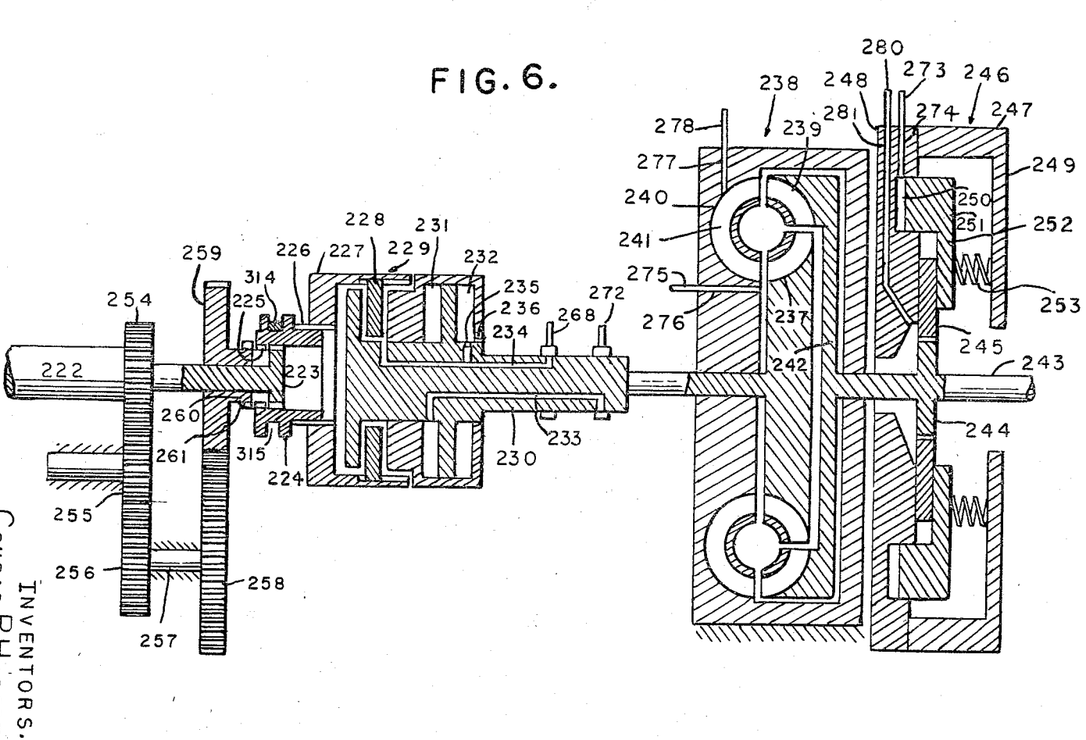
FIG. 6 is a schematic, sectional elevation showing a modification of the FIG. 1 transmission in which only one clutch is employed and up and down movements of the load are determined by the position relation of a shift collar to a reverse gear train interposed between the clutch and power source, the clutch being shown released and the brake engaged.
Figure 7:
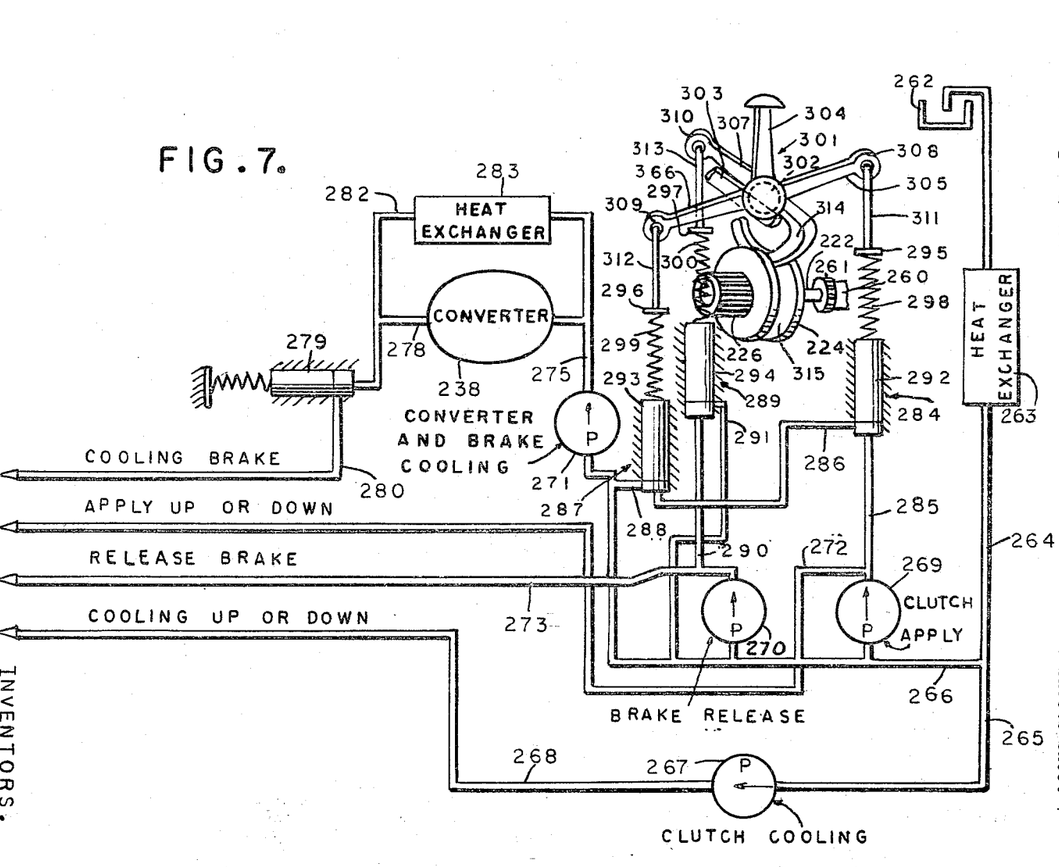
FIG. 7 is a schematic of the oil circuitry for the FIG. 6 transmission.

In FIGS. 6 and 7 is shown a still further modification which includes one clutch, a converter and a brake with a shift collar controlled, reverse gear train interposed between the clutch and a unidirectional power source.

Referring to FIG. 6 and first considering a conditioning of the transmission for up movement, the numeral 222 designates an input shaft whose opposite ends are respectively connected to a power source (not shown) and to a peripherally toothed ring 223 which in the relation shown extends within but does not have driving engagement with a shift collar 224 that is internally toothed adjacent the left end only as at 225. The collar 224 is externally toothed or splined adjacent its right end only as at 226 for constant driving engagement with a driving spider 227 which is internaly splined for engagement with a driving clutch plate 228 forming part of an hydraulically actuated, friction plate clutch 229 that is carried by and encircles an intermediate shaft 230. Since this clutch is generally similar to those heretofore described, it will be sufficient to briefly identify its principal features.

The clutch 229 includes apply and balance chambers 231 and 232, respectively, and the shaft 230 includes a passage 233 for supplying pressure oil to the apply chamber 231 and a passage 234 for supplying cooling oil to the friction elements of the clutch and oil through an orifice 235 to the balance chamber 232 which may be conventionally relieved through a vent 236.

The intermediate shaft 230 is drivably connected to an impeller 237 forming part of a stationary housing, single stage, hydraulic torque converter 238 which otherwise includes a turbine 239 and stator 240, the impeller 237, turbine 239 and stator 240 being conventionally related in a toroidal circuit 241. The turbine 239 is carried by a disk 242 which is mounted on an output shaft 243.

The output shaft 243 carries a peripherally splined hub 244 on which is axially slidable an internally splined brake ring 245 forming part of a brake 246. The latter is generally similar to the brake 57 in FIG. 1 and includes an annular housing 247 which is coaxial with the output shaft 243 and carries annular end walls 248 and 249. Recessed in the end wall 248 is an annular release chamber 250 in which is reciprocable an annular piston 251 carrying an inwardly extending, annular plate 252. A plurality of springs 253 suitably spaced around the housing 247 between the wall 249 and the plate 252 bias the plate 252 to the fully engaged brake position shown in which the plate 252 frictionally engages the brake ring 245 against the wall 248.

So far as described and with the shift collar 224 moved to the right to engage the toothed ring 223, the clutch 229 modulatingly engaged and the brake 246 released, power flow through the transmission is in a direction to move the load upwardly. The arrangement for effecting power down movements will now be described.

The input shaft 222 carries an attached gear 254 which drives through an idler gear 255 a gear 256 mounted on one end of a shaft 257 whose opposite end carries a gear 258 that meshes with a gear 259 that rotates on and relative to the input shaft 222. The gears 254, 255, 256, 258 and 259 constitute a reverse gear train. The gear 259 includes a hub 260 which extends towards the ring 223 and is peripherally toothed at 261. In the position of parts as shown, the shift collar 224 is in neutral position with its toothed portion 225 between the toothed ring 223 and the toothed portion 261 on the gear hub 260 and when the shift collar 224 is shifted to the right to engage its toothed portion 225 with the toothed ring 223, the drive is from the ring 223 through the collar 224 to the spider 227 and this condition determines up movements of the load. For power down movements, the shift collar 224 is moved to the left, as presently described, to break connection with the ring 223 and establish connection of its splined or toothed portion 225 with the toothed portion 261 of the hub 260 while maintaining toothed connection with the spider 227. As in FIG. 1 and with the brake 246 released, the impeller 237 and turbine 239 then rotate in reverse direction.

The oil circuit for the FIG. 6 transmission and the control therefore is shown in FIG. 7 to which reference will now be made.

Oil is withdrawn from a sump 262 through a heat exchanger 263 whose outlet pipe 264 connects with parallel flow pipes 265 and 266. The inlet of a pump 267 connects with the pipe 265 and this pump discharges through a pipe 268 to the passage 234 (see FIG. 6) to supply oil to the balance chamber 232 and to the friction elements of the clutch 229.

The inlets of pumps 269, 270 and 271 connect with the pipe 266 so that these pumps are in parallel flow relation and as group are in like relation to the pump 267. The outlet of the pump 269 connects through a pipe 272 with the passage 233 (see FIG. 6) leading to the apply chamber 231 and controlled as presently described to determine modulating engagement of the clutch 229 for up or down movements. The outlet of the pump 270 connects through a pipe 273 with a passage 274 in the brake housing 247 (see FIG. 6) leading to the release chamber 250 to release the brake 246 under controlled conditions. The outlet of the pump 271 connects through a pipe 275 with a passage 276 in the converter 238 (see FIG. 6) leading to the toroidal circuit 241 and discharge from this circuit is successively through a passage 277 in the converter 238 and a pipe 278 to the inlet of a conventional pressure regulating valve 279 whose outlet connects through a pipe 280 and a passage 281 in the brake housing 247 to supply cooling oil to the friction elements of the brake 246. Bridged around the converter 238 and for the same purpose as stated for FIG. 2 is a pipe 282 which includes a heat exchanger 283.

The pressures in the apply up or down pipe 272 and in the brake release pipe 273 is modulatingly controlled generally in the same manner as shown with a minor variation, but the FIG. 7 control additionally determines actuation of the shift collar 224 for up or down movements.

Specifically, pressure in the pipe 272 is controlled for up movement by a pressure regulating valve 284 whose inlet connects by a pipe 285 with the pipe 272 and therefore with the outlet of the pump 269. The outlet of the valve 284 connects by a pipe 286 with the inlet of a pressure regulating valve 287 whose outlet connects by a pipe 288 with the pipe 266 leading to the pump 271. Control of the valve 284 determines directly apply pressure for the clutch 229 during up movements while control of the valve 287 determines apply pressure for the clutch 229 during down movements, but the latter control acts through the pipe 286, valve 284 and pipe 285.

Brake release is determined by controlling a pressure regulating valve 289 whose inlet connects by a pipe 290 with the pipe 273 and hence with the outlet of the pump 270 and the outlet of the valve 289 connects by a pipe 291 with the pipe 266.

The valves 284, 287 and 289 include conventional pistons 292, 293 and 294 and interposed therebetween and push plates 295, 296 and 297 are springs 298, 299 and 300, all respectively. As with the other controls described above, movements of the push plates 295, 296 and 297 towards the pistons 292, 293 and 294 loads the springs 298, 299 and 300, all respectively, to any desired extent.

A single control member 301 is also used in this modification and it and the shift collar 224 are shown in isometric view. The control member 301 is mounted for universal movement as schematically indicated by a ball 302 mounted on a support 303. The member 301 includes a handgrip 304, arms 305 and 306 extending oppositely from the grip 304 and generally normal thereto, and a third arm 307 lying generally in the same plane as the arms 305 and 306 and normal thereto. The outer ends of the arms 305, 306 and 307 may be enlarged to provide platforms 308, 309 and 310 against which constantly bear the enlarged ends of pushrods 311, 312 and 313 whose opposite ends carry the push plates 295, 296 and 297, all respectively.

The control member 301 also carries an arcuate tang 314 which, in the neutral position of the shift collar 224 shown in FIGS. 6 and 7, is received within the annular channel 315 of the collar.

If an up movement of the load is desired when the shift collar 224 is in neutral position, the clutch 229 released and the brake 246 engaged, all as shown in FIGS. 6 and 7, the control member 301 is rocked to cause a movement of the arm 307 to load the spring 300 and thus produce release chamber 250 pressure. This movement of the control member 301 does not change the relation between the shift collar 224 and tang 314 as shown in FIG. 7. Assuming the load is in its lowest position, the maximum brake release pressure may be established before clockwise rocking of the control member 301 to begin loading the spring 298 while maintaining the release loading on the spring 300. Loading of the spring 298 provides for pressure rise in the apply chamber 231 to start up movement of the load.

Simultaneous with the above clockwise rock of the control member 301, the tang 314 effects a movement of the shift collar 224 to the right and left, respectively, as viewed in FIGS. 6 and 7, to connect the ring 223 through the shift collar 224 with the spider 227 to produce up movement. The relation between the shift collar 224 and tang 314 is such that when the shift collar 224 has moved to the up drive position, the tang 314 swings clear of the shift collar 224 to permit any desired modulation of the spring 298. Down movements are achieved by a reverse rocking of the control member 301 as will be apparent. The characteristics of this modification are generally similar to FIGS. 1 and 2, but only one clutch is employed.

We claim:

1. For use with apparatus having means for hoisting and lowering a load, a power transmission connectible to a power source and including hoisting and lowering power trains having a common hydraulic torque converter and an output connected to the converter, hydraulically actuated, friction clutch means interposed between the converter and power source, and means for selectively and modulatingly determining opposite rotations, respectively, of the clutch means to provide hoisting and lowering of the load.

2. A power transmission as defined in claim 1 wherein the clutch means includes apply chamber means for receiving pressure oil, and means for modulating the pressure in the apply chamber means in either rotation of the clutch means.

3. A power transmission as defined in claim 1 wherein the clutch means includes hoisting and lowering, hydraulically actuated, friction clutches separately connectible to the power source and having a common connection with the converter, and a reverse gear train interposed between the power source and the input of the lowering clutch.

4. A power transmission as defined in claim 3 wherein each clutch includes an apply chamber for receiving pressure oil, and means for modulating the pressure in either apply chamber.

5. A power transmission as defined in claim 1 wherein the clutch means is constituted by one clutch for providing hoisting and lowering, a reverse gear train whose input is connected to the power source and having an output gear, and a shift collar movable between positions connecting the clutch directly to the power source and output gear, respectively.

6. A power transmission as defined in claim 5 wherein the clutch includes an apply chamber for receiving pressure oil, and means for modulating the pressure in the apply chamber.

7. A power transmission as defined in claim 1 wherein the clutch means is constituted by one clutch having an apply chamber for receiving pressure oil and the power source by a reversible motor, and control means for modulating the pressure in the apply chamber and determining the rotation direction of the motor.

8. For use with apparatus having means for hoisting and lowering a load, a power transmission connectible to a power source and including hoisting and lowering power trains having a common hydraulic torque converter and an output connected to the converter, hydraulically actuated, friction clutch means interposed between the converter and power source, a brake carried by the converter output and spring biased for engagement to hold the load in any position and hydraulically actuated for release, and means for selectively and modulatingly determining opposite rotations, respectively, of the clutch means to provide hoisting and lowering of the load and for simultaneously determining release of the brake.

9. A power transmission as defined in claim 8 wherein the simultaneous engagement of either clutch and the release of the brake is determined by a universally mounted control member.

10. For use with apparatus having means for hoisting and lowering a load, a power transmission connectible to a power source and including hoisting and lowering power trains having a common hydraulic torque converter and an output connected to the converter, a hydraulically actuated friction clutch interposed between the converter and power source to provide hoisting and lowering, a reverse gear train whose input is connected to the power source and having an output gear, a shift collar movable between positions connecting the clutch directly to the power source and output gear, respectively, a brake carried by the converter output and spring biased for engagement to hold the load in any position and hydraulically actuated for release, and means for simultaneously determining the position of the shift collar to provide hoisting or lowering and the release of the brake.

11. A power transmission as defined in claim 10 wherein the shift collar position and brake release is determined by a universally mounted control member.

12. A power transmission as defined in claim 8 wherein the clutch means includes hoisting and lowering, hydraulically actuated, friction clutches separately connectible to the power source and having a common connection with the converter, a reverse gear train interposed between the power source and the input of the lowering clutch, each clutch including an apply chamber and the brake including a release chamber, a pressure oil circuit including all chambers, and the modulating means including first and second pressure regulating valves connected to the apply chambers of the hoisting and lowering clutches, respectively, and a third pressure regulating valve connected to the release chamber, all valves being enbodied in the oil circuit, each valve having a piston and a spring abutting each piston and arranged to be loaded by the control means to respectively regulate the pressures in the apply and release chambers during hoisting and lowering movements.

13. A power transmission as defined in claim 10 wherein the clutch and brake respectively include apply and release chambers, a pressure oil circuit including all chambers, and modulating means including first and second pressure regulating valves connected to the apply chamber for regulating pressure therein during hoisting and lower, respectively, and a third pressure regulating valve connected to the release chamber, all valves being embodied in the oil circuit, each valve having a piston and a spring abutting each piston and arranged to be loaded by the same means which determines position of the shift collar.

14. For use with apparatus having means for hoisting and lowering a load, a power transmission connectible to a power source and including hoisting and lowering power trains having a common hydraulic torque converter, the power trains including hoisting and lowering, hydraulically actuated, friction clutches separately connectible to the power source and having a common connection with the converter, means for selectively determining the engagement of the clutches and each clutch including an apply chamber, a reverse gear train interposed between the power source and the input of the lowering clutch, an oil circuit for supplying pressure oil to the apply chambers and cooling oil to the friction elements of the hoisting and lowering clutches, a position valve located in that part of the oil circuit which supplies pressure oil, the position valve being shiftable by pressures selectively established in the apply chambers of the hoisting and lowering clutches between positions determining cooling oil flow to the friction elements of the hoisting and lowering clutches, respectively, and means for modulating the pressure in either apply chamber.

15. A power transmission as defined in claim 14 wherein the position valve has outlets respectively connecting with the friction elements of the hoisting and lowering clutches, and pipe means including an orifice bridged between the outlets for allocating a major portion of the cooling oil to the engaged clutch and a minor portion to the released clutch.

16. A power transmission as defined in claim 8 wherein the clutch means includes hoisting and lowering, hydraulically actuated, friction clutches separately connectible to the power source and having a common connection with the converter, a reverse gear train interposed between the power source and the input of the lowering clutch, each clutch including an apply chamber and the brake including a release chamber, a pressure oil circuit including all chambers, and the modulating means including first and second pressure regulating valves connected to the apply chambers of the hoisting and lowering clutches, respectively, and a third pressure regulating valve connected to the release chamber, all valves being embodied in the oil circuit, each valve having a piston and a spring abutting each piston and arranged to be loaded by the control means to respectively regulate the pressures in the apply and release chambers during hoisting and lowering movements, the oil circuit including a first provision for supplying cooling oil to the friction elements of the hoisting and lowering clutches, a position valve included in that part of the oil circuit which supplies pressure oil to the clutches, the position valve being shiftable by pressures established in the apply chambers, respectively, between positions determining cooling oil flow to the friction elements of the clutches during hoisting and lowering, and a second provision in the oil circuit including a pumped supply to the converter whose discharge is delivered to the friction elements of the brake for cooling.

17. A power transmission as defined in claim 16 wherein the position valve has outlets respectively connecting with the friction elements of the hoisting and lowering clutches, and pipe means including an orifice bridged between the outlets for allocating a major portion of the cooling oil to the engaged clutch and a minor portion to the released clutch.

18. For use with apparatus having means for hoisting and lowering a load, a power transmission connectible to a power source and including hoisting and lowering power trains having a common hydraulic torque converter and an output connected to the converter, hydraulically actuated, friction clutch means interposed between the converter and power source, means for selectively determining opposite rotations, respectively, of the clutch means to provide hoisting and lowering of the load, the clutch means including apply chamber means for receiving pressure oil, means for modulating the pressure in the apply chamber means in either rotation of the clutch means, a pressure oil circuit including the apply chamber means, modulating means and the converter, and a heat exchanger bridged around and connecting with the oil inlet to and discharge from the converter to promote cooling by auto-circulation between the converter and heat exchanger.

References Cited

UNITED STATES PATENTS

| | | | |
|---|---|---|---|
| 2,866,361 | 12/1958 | Gatiss | 192—3.5 X |
| 2,939,557 | 6/1960 | Dabich et al. | 192—3.5 |
| 3,033,335 | 5/1962 | Hause | 192—3.2 |
| 3,202,018 | 8/1965 | Hilpert | 192—3.2 X |

MARK NEWMAN, *Primary Examiner*.

ARTHUR T. McKEON, *Examiner*.